US005663703A

United States Patent [19]
Pearlman et al.

[11] Patent Number: 5,663,703
[45] Date of Patent: Sep. 2, 1997

[54] SILENT WRIST PAGER WITH TACTILE ALARM

[75] Inventors: Ted Louis Pearlman, Montclair; Andrew Todd Zidel, Mountainside, both of N.J.

[73] Assignees: Sony Corporation, Tokyo, Japan; Sony Electronics, Inc., Park Ridge, N.J.

[21] Appl. No.: 501,366

[22] Filed: Jul. 12, 1995

[51] Int. Cl.$^6$ .................... H04B 3/36

[52] U.S. Cl. .................... 340/407.1; 340/407.2; 340/311.1; 340/573; 340/539; 340/693; 455/347; 455/351

[58] Field of Search .................... 340/407.1, 407.2, 340/573, 311.1, 539, 693; 116/284, 289; 45/351, 347

[56] References Cited

U.S. PATENT DOCUMENTS

| | | | |
|---|---|---|---|
| 3,618,070 | 11/1971 | Kagan | 340/407.1 |
| 4,297,677 | 10/1981 | Lewis et al. | 340/407.1 |
| 5,007,105 | 4/1991 | Kudoh et al. | 340/311.1 |
| 5,159,713 | 10/1992 | Gaskill et al. | 455/344 |
| 5,307,520 | 4/1994 | Oyamada et al. | 455/347 |
| 5,337,364 | 8/1994 | Fitch | 381/68.3 |

*Primary Examiner*—Thomas Mullen
*Assistant Examiner*—Julie B. Lieu
*Attorney, Agent, or Firm*—Jay H. Maioli

[57] ABSTRACT

A wrist-worn paging receiver provides an incoming message alarm by contacting the wrist of the user by the use of rotating cam lobes that reside inside the paging receiver and that are separated from actual contact with the user's skin by a thin, flexible membrane. Various alarm modes are provided by controlling the ratio of the period of rotation to period of rest of the cam lobes mounted on a cam shaft that is driven by an electric motor inside the paging receiver.

12 Claims, 2 Drawing Sheets

FIG. 3
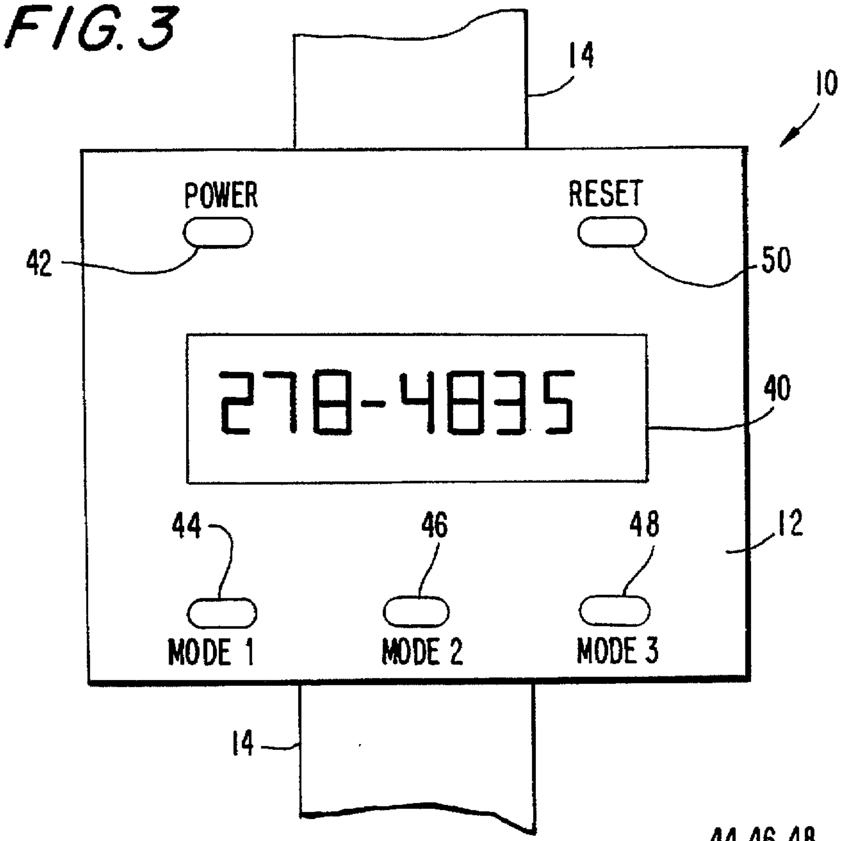
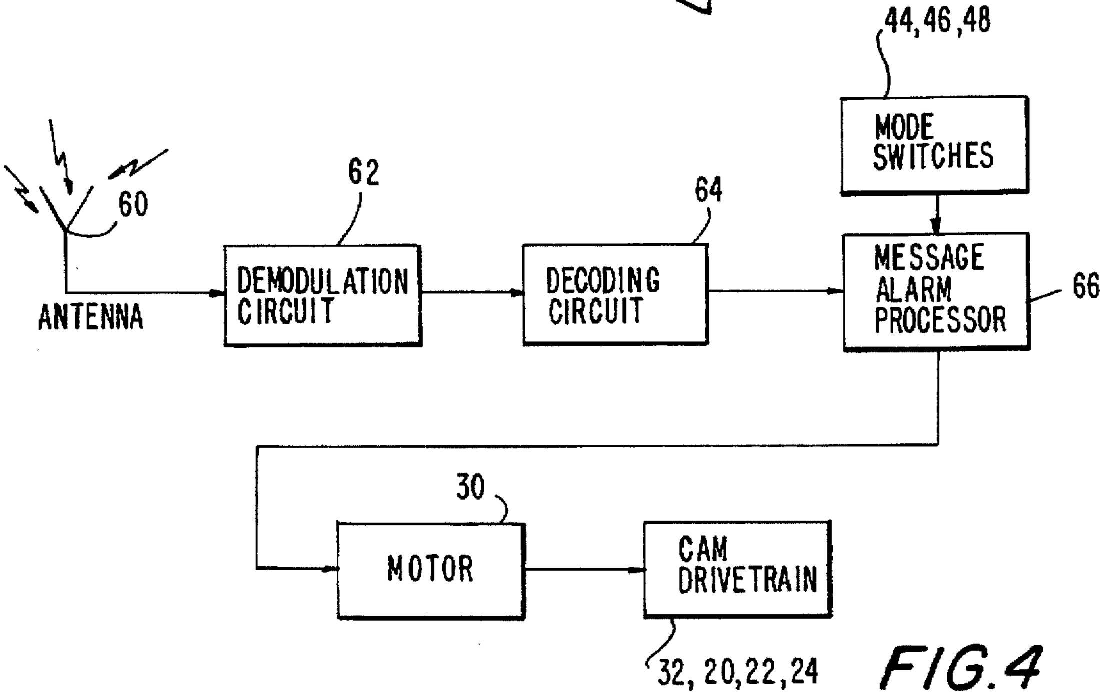
FIG. 4

SILENT WRIST PAGER WITH TACTILE ALARM

BACKGROUND OF THE INVENTION

1. Field of the Invention

The present invention relates generally to a paging receiver and, more particularly, to a paging receiver having a silent alarm.

2. Description of Background

Paging receivers are now becoming quite common and well known and are used by many persons including doctors, delivery people, and repair service providers. Generally, such pagers emit a beeping tone and/or flash a light when an incoming message is received. Paging receivers are also known that do not emit tones but produce a vibration that is sensed by the user. Such silent paging alarms are useful in instances where the audible alarm would be annoying to the surrounding persons or would, in fact, be dangerous to the receiver of the incoming call.

In the case of such silent alarms employing vibrations for getting the user's attention, the paging unit is typically clipped to the belt of the user so that it is frequently difficult for the user to detect these alarm vibrations. Furthermore, if the pager is placed in the coat pocket of the user, the vibrations are frequently impossible to detect.

OBJECTS AND SUMMARY OF THE INVENTION

Accordingly, it is an object of the present invention to provide a paging receiver in which a silent alarm is provided that can eliminate the above-noted defects inherent in the prior art.

Another object of this invention is to provide a paging receiver with a silent alarm that can be worn on the wrist of the user, in which the alarm is in the form of tactile impressions made against the skin of the user.

A further object of this invention is to provide a wrist-worn paging receiver that employs rotating cams to provide the tactile information to the user.

In accordance with an aspect of the present invention, a paging receiver that is intended to be worn on the wrist of the user and that can receive incoming messages is provided. Also, the user can select the kind of alarm that is provided. The alarm is produced by a rotating cam shaft having multiple lobes that is mounted inside the body of the paging receiver so that the lobes protrude slightly in order to contact the user's skin. The cam shaft and lobes are located behind a thin membrane, so that the interior of the paging receiver is sealed from the external environment.

According to another aspect of the present invention, various modes of alarm can be selected by the user with such modes of alarm relating to the ratio of the period of rotation to periods of rest.

According to another aspect of the present invention, the incoming message can include alarm mode information, so that the receiving pager provides various modes of alarm without having the user select such modes.

The above and other objects, features, and advantages of the present invention will become apparent from the following detailed description of illustrative embodiments thereof to be read in conjunction with the accompanying drawings, in which like reference numerals represent the same or similar elements.

BRIEF DESCRIPTION OF THE DRAWINGS

FIG. 3 is a top, plan view of the paging receiver of FIG. 1; and

FIG. 4 is a schematic in block diagram form showing the signal path relative to the embodiment of FIG. 1.

DETAILED DESCRIPTION OF PREFERRED EMBODIMENTS

Figure 1:
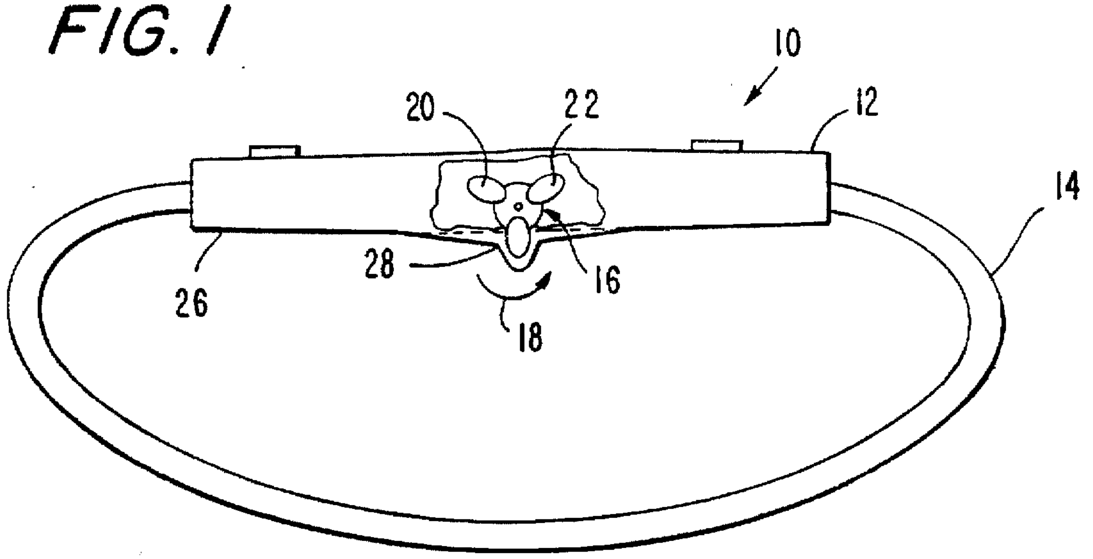
FIG. 1 is a side elevational view in partial cross section representing a wrist-worn paging receiver according to an embodiment of the present invention.

FIG. 1 is a side elevational representation of a wrist worn paging receiver according to an embodiment of the present invention in which a portion of the case is cut away to show the interior of the body of the paging receiver.

More specifically, a paging receiver 10 includes a case or body 12 and a strap 14 so that the pager may be attached to the wrist of the user in the conventional wrist-watch fashion.

A portion of the body or case 12 is cut away in the view of FIG. 1 to show the rotating cam shaft system shown generally at 16 that is provided according to this embodiment of the present invention. The construction of this rotating cam system 16 is shown more clearly in FIG. 2. The rotation of the cam shaft system 16 is represented as being counter clockwise by the arrow 18, however, the rotation could just as easily be clockwise. A display of the information is provided on the top surface of the receiving pager 10 and controls are provided on the top surface as well for operation by the user of the paging receiver. The lobes 20, 22, 24 of the rotating cam shaft system 16 extend below the bottom surface 26 of the paging body 12 and are separated from actually contacting the wrist (not shown) of the user by a thin flexible membrane 28. This membrane 24 may be formed of polyurethane, for example.

Figure 2:
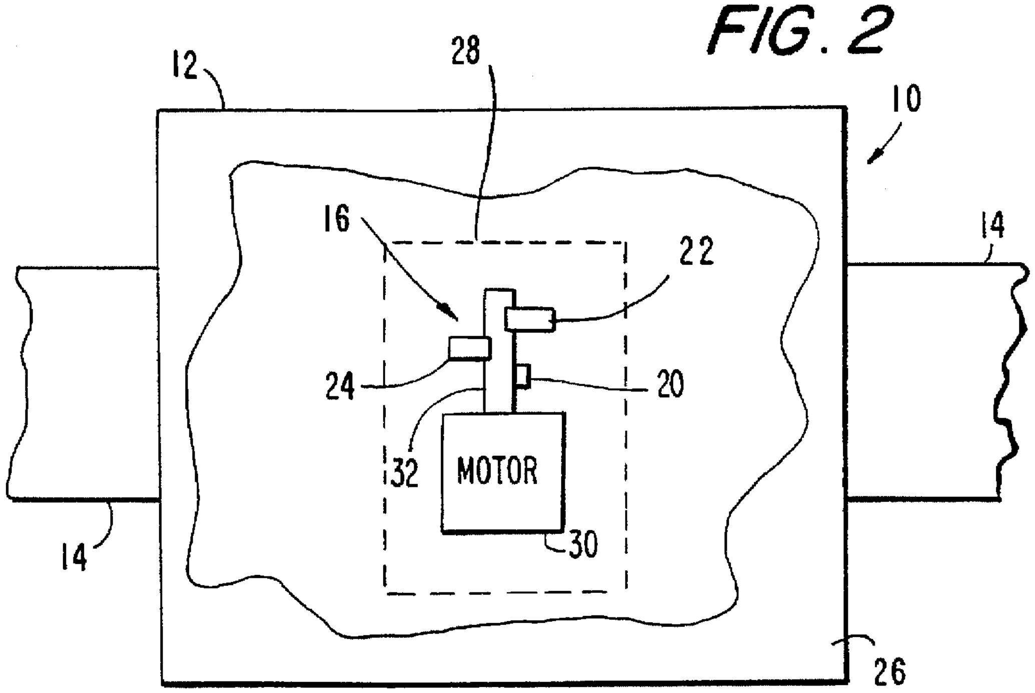
FIG. 2 is a rear elevational view of the paging receiver of FIG. 1.

FIG. 2 is a bottom view of the paging receiver 10 of FIG. 1 in which the bottom surface 26 is cut away and the overall area of the polyurethane cover 24 is shown by broken lines, so that a motor and the cam shaft system 16 arranged in the body 12 of the paging receiver 10 can be seen. More specifically, a motor 30 drives a cam shaft 32 on which are mounted the three cam lobes 20, 22, and 24. The cams 20, 22, 24 are mounted 120° apart on the cam shaft 32, but other arrangements are also possible. The motor 30 runs at approximately two revolutions per second. The motor 30 is powered by a battery, not shown.

Thus, as represented in FIG. 1, as the motor 30 causes the cam shaft 32 to rotate, the cam lobes 20, 22, 24 sequentially extend beyond the back surface 26 of the body 12 and, although separated from contact with the skin of the user by the polyurethane cover 24, are felt by the user when the paging receiver 10 is mounted on the user's wrist.

FIG. 3 is a top, plan view of the paging receiver 10 of FIGS. 1 and 2 in which a display 40 is shown along with a number of controls or operating buttons for actuation by the user. For example, a power button 42 is provided to turn the power on and off for the receiver and alarm mode buttons are also provided. A Mode One button 44, a Mode Two button 46, and a Mode Three button 48 are all provided on the top surface of the body 12 of the paging receiver 10. The three modes correspond to various operational modes of the rotating cam assembly 16 shown in FIG. 2.

In accordance with the embodiment being described, Mode One could be a constant rotational speed of the cam shaft 32 and cams 20, 22, and 24 for a predetermined period of time. On the other hand, Mode Two could be an intermittent rotation of the cam shaft 32 and cams 20, 24, and 26. For example, a one second period of rotation, a one second rest period, and then repeating that sequence for a predetermined number of cycles.

Mode Three is an intermittent rotation of the cam shaft 32 and cams 20, 22, and 24 such that there is a one second period of rotation, a half second rest period, a one second period of rotation, and a two second rest period, and then repeating that sequence continuously for some predetermined number of cycles.

In addition, a reset button 50 is provided to permit the user to have the opportunity to make an initial default setting for the alarm mode.

FIG. 4 is a schematic in block diagram form of the operational elements forming the paging receiver 10 described above. In FIG. 4, an antenna 60 receives the incoming message signal and feeds that signal to a demodulator 62, where the high-frequency carrier is separated from the information and then the demodulated signal is fed to a decoder 64 where the coded information is decoded. A message alarm processor 66 then determines the presence of new messages and any priority/category indicators in the decoded information and provides an energization signal to the motor 30 that rotates the cam shaft 32 and causes the cams 20, 22, and 24 to produce a tactile alarm to the user.

As described above, the user can select the alarm mode using switches provided on the body of the pager. Alternatively, the alarm mode can be included in the transmitted message, so that upon decoding the message the message alarm processor 66 controls the motor 30 according to the received alarm mode.

In the operation of the paging receiver 10 described above, the user activates the power for the receiver by actuating button 42 and then selects the desired alarm mode by actuating one of buttons 44, 46, and 48. When an incoming message is received by antenna 60, it is demodulated and decoded and the alarm information is processed. A specific energization signal is fed to the motor 30 based upon which of the mode switches 44, 46, and 48 has been actuated. Then the motor 30 operates to rotate the cam shaft 32 and thereby cause the cams 20, 24, and 26 to protrude sequentially from the back surface 22 of the case 12, to abut the polyurethane cover 24, and to provide a tactile sensation to the wrist of the user.

Various modes are contemplated such as a constant alarm in which the cam rotates continuously for approximately five seconds with a rotational speed of approximately two revolutions per second or a mode that is an on/off alarm in which the cam shaft rotates for one second and then rests for one second and then repeats this cycle five to ten times. Another mode can comprise an intermittent rotation of the cam shaft in which the cams rotates for one second, have a half second rest rotate for one second, and have a two second rest, with this cycle being repeated five to ten times. The alarm can be stopped as desired by pressing the reset button 50.

The tactile alarm system described above could also be employed as an alarm in any device worn against the skin, for example, the system could be used as a conventional watch alarm. Also, a larger or smaller number of cams other than three could be advantageously employed.

Although the present invention has been described hereinabove with reference to the preferred embodiments, it is to be understood that the invention is not limited to such illustrative embodiments alone, and various modifications may be contrived without departing from the spirit or essential characteristics thereof, which are to be determined solely from the appended claims.

What is claimed is:

1. An alarm system for a device worn against a skin surface of a user, comprising:

a case body having a front surface and a back surface;

a motor arranged inside said case body;

cam means arranged to be rotated by said motor and mounted in said body so that a rotating portion of said cam means extends beyond the back surface of said case body;

a flexible membrane attached to said case body and covering a portion of said back surface whereat said cam means extends;

a strap for attaching said case body to a user so that said flexible membrane is in contact with a skin surface of the user; and alarm mode control means for controlling a ratio of rotation periods and rest periods of said motor, wherein said alarm mode control means comprises a message alarm processor for controlling said motor in accordance with mode information included in a wireless transmitted signal received by the device.

2. The alarm system according to claim 1, wherein said cam means includes a cam shaft attached to said motor and three cam lobes mounted on said cam shaft.

3. The alarm system according to claim 2, wherein said three cam lobes are equally circumferentially spaced around said cam shaft.

4. The alarm system according to claim 1, wherein said flexible membrane is formed of polyurethane.

5. The alarm system according to claim 1, wherein said strap is adapted for attachment to the wrist of the user.

6. The alarm system according to claim 1, further comprising display means arranged on the front surface of said case body.

7. The alarm system according to claim 1, wherein said alarm mode control means comprises a plurality of switches arranged on the front surface of said case body for selecting one of a respective plurality of alarm modes upon actuation of one of said plurality of mode switches by the user.

8. An alarm system for a paging receiver, comprising:

a paging receiver body;

rotating cam means arranged in said body and having a rotating portion thereof extending beyond a back surface of said body;

a flexible membrane attached to said body so as to cover said rotating portion extending beyond the back surface of said body;

alarm mode control means for controlling a ratio of rotation periods and rest periods of said rotating cam means in response to an alarm mode input; and a strap for attaching said paging receiver body to a user of the paging receiver so that said membrane is in contact with a wrist of the user, wherein said alarm mode control means comprises a plurality of pushbuttons mounted on a front surface of said body for actuation by the user and providing said alarm mode input for selecting one of a plurality of alarm modes having different respective ratios of rotation periods and rest periods.

9. An alarm system for a paging receiver, comprising:

a paging receiver body;

rotating cam means arranged in said body and having a rotating portion thereof extending beyond a back surface of said body;

a flexible membrane attached to said body so as to cover said rotating portion extending beyond the back surface of said body;

alarm mode control means for controlling a ratio of rotation periods and rest periods of said rotating cam means in response to an alarm mode input; and a strap for attaching said paging receiver body to a user of the paging receiver so that said membrane is in contact with a wrist of the user, wherein said alarm mode control means comprises a message alarm processor mounted in said body for producing said alarm mode input in response to an externally transmitted signal for selecting one of a plurality of alarm modes having different respective ratios of rotation periods and rest periods in response to mode information contained in said externally transmitted signal.

10. The alarm system according to claim 9, wherein said rotating cam means includes a motor, a cam shaft attached to said motor, and three cam lobes attached to said cam shaft, wherein as said motor rotates said cam shaft said cam lobes sequentially become said rotating portion extending beyond said back of said body.

11. The alarm system according to claim 10, wherein said membrane is formed of polyurethane.

12. The alarm system according to claim 11, further comprising a message display arranged on the front surface of said body.

* * * * *